United States Patent
Besehanic et al.

(10) Patent No.: US 9,760,898 B2
(45) Date of Patent: Sep. 12, 2017

(54) METHODS AND APPARATUS TO DETECT ENGAGEMENT WITH MEDIA PRESENTED ON WEARABLE MEDIA DEVICES

(71) Applicant: The Nielsen Company (US), LLC, Schaumburg, IL (US)

(72) Inventors: Jan Besehanic, Tampa, FL (US); Arun Ramaswamy, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 226 days.

(21) Appl. No.: 14/250,068

(22) Filed: Apr. 10, 2014

(65) Prior Publication Data
US 2015/0193785 A1 Jul. 9, 2015

Related U.S. Application Data

(60) Provisional application No. 61/923,859, filed on Jan. 6, 2014.

(51) Int. Cl.
*G06Q 10/00* (2012.01)
*G06Q 30/02* (2012.01)

(52) U.S. Cl.
CPC .................. *G06Q 30/0201* (2013.01)

(58) Field of Classification Search
USPC ....................................................... 705/7.29
See application file for complete search history.

(56) References Cited

U.S. PATENT DOCUMENTS

| | | | |
|---|---|---|---|
| 6,929,365 B2 * | 8/2005 | Swab | G02C 11/10 16/228 |
| 8,412,577 B2 | 4/2013 | Rodriguez | |
| 8,467,133 B2 * | 6/2013 | Miller | G02B 27/017 353/28 |
| 8,878,749 B1 * | 11/2014 | Wu | G01S 17/06 345/8 |
| 2010/0004977 A1 * | 1/2010 | Marci | G06Q 10/10 705/7.32 |
| 2012/0068913 A1 * | 3/2012 | Bar-Zeev | G02B 26/026 345/8 |

(Continued)

FOREIGN PATENT DOCUMENTS

| | | |
|---|---|---|
| JP | 08328512 | 12/1996 |
| JP | 2002-210237 | 7/2002 |

(Continued)

OTHER PUBLICATIONS

The Marketing Research Applications of Facial Recognition Technology, Feb. 6, 2014, Market Research Association, p. 1-7.*

(Continued)

*Primary Examiner* — Beth V Boswell
*Assistant Examiner* — Joseph Waesco
(74) *Attorney, Agent, or Firm* — Hanley, Flight & Zimmerman, LLC

(57) ABSTRACT

Methods and apparatus to detect engagement with media presented on a wearable media device are disclosed. An example method includes determining a degree of opacity of a media presentation displayed on a wearable media device; and calculating an engagement score for media presented via the media presentation based on the degree of opacity.

13 Claims, 9 Drawing Sheets

(56) References Cited

U.S. PATENT DOCUMENTS

| | | | | |
|---|---|---|---|---|
| 2012/0200601 | A1* | 8/2012 | Osterhout | G02B 27/0093 345/633 |
| 2012/0212484 | A1* | 8/2012 | Haddick | G02B 27/0093 345/419 |
| 2012/0290401 | A1* | 11/2012 | Neven | A61B 3/113 705/14.68 |
| 2013/0007236 | A1* | 1/2013 | Besehanic | H04N 21/25891 709/223 |
| 2013/0007298 | A1* | 1/2013 | Ramaswamy | H04L 65/607 709/231 |
| 2013/0016413 | A1* | 1/2013 | Saeedi | G02B 27/01 359/205.1 |
| 2013/0050432 | A1* | 2/2013 | Perez | H04N 13/0278 348/47 |
| 2013/0100259 | A1* | 4/2013 | Ramaswamy | H04N 13/0438 348/54 |
| 2013/0106674 | A1* | 5/2013 | Wheeler | G02B 27/017 345/8 |
| 2013/0162505 | A1* | 6/2013 | Crocco | G09G 5/00 345/7 |
| 2013/0162673 | A1* | 6/2013 | Bohn | G02B 27/0172 345/633 |
| 2013/0278631 | A1* | 10/2013 | Border | G02B 27/017 345/633 |
| 2014/0129935 | A1* | 5/2014 | Ovadia Nahon | G06F 3/01 715/716 |

FOREIGN PATENT DOCUMENTS

| | | |
|---|---|---|
| JP | 2007-528030 | 10/2007 |
| JP | 2008185609 | 8/2008 |
| JP | 2013197637 | 9/2013 |
| WO | 2005086969 | 9/2005 |
| WO | 2012160247 A1 | 11/2012 |
| WO | 2015102771 | 7/2015 |

OTHER PUBLICATIONS

Patent Cooperation Treaty, "International Search Report," issued in connection with Application No. PCT/US2014/066912, Feb. 23, 2015, 3 pages.

Patent Cooperation Treaty, "Written Opinion of the International Searching Authority," issued in connection with Application No. PCT/US2014/066912, Feb. 23, 2015, 8 pages.

International Bureau, "International Preliminary Report on Patentability," issued in connection with International Patent Application No. PCT/US2014/066912, mailed Jul. 21, 2016 (10 pages).

Korean Intellectual Property Office, "Notice of Preliminary Rejection," issued in connection with Korean Patent Application No. 10-2016-7018001, mailed Mar. 16, 2017 (11 pages).

Japanese Patent Office, "Notice of Reasons for Rejection," issued in connection with Japanese Patent Application No. P2016-535136, dated Apr. 25, 2017 (13 pages).

* cited by examiner

METHODS AND APPARATUS TO DETECT ENGAGEMENT WITH MEDIA PRESENTED ON WEARABLE MEDIA DEVICES

RELATED APPLICATION

This patent claims the benefit of U.S. Provisional Patent Application No. 61/923,859, filed on Jan. 6, 2014, which is hereby incorporated herein by reference in its entirety.

FIELD OF THE DISCLOSURE

This disclosure relates generally to audience measurement, and, more particularly, to methods and apparatus to detect engagement with media presented on wearable media devices.

BACKGROUND

Media monitoring companies desire information related to user interactions with, for example, media devices. To this end, the media monitoring companies obtain monitoring information related to media presented at the media devices such that the media monitoring entities gain knowledge of, for example, exposure to advertisements, exposure to content (e.g., programming, webpages, etc.), user purchasing activity correlated to exposure to media, demographic information for audiences exposed to media, etc.

DETAILED DESCRIPTION

Figure 1:
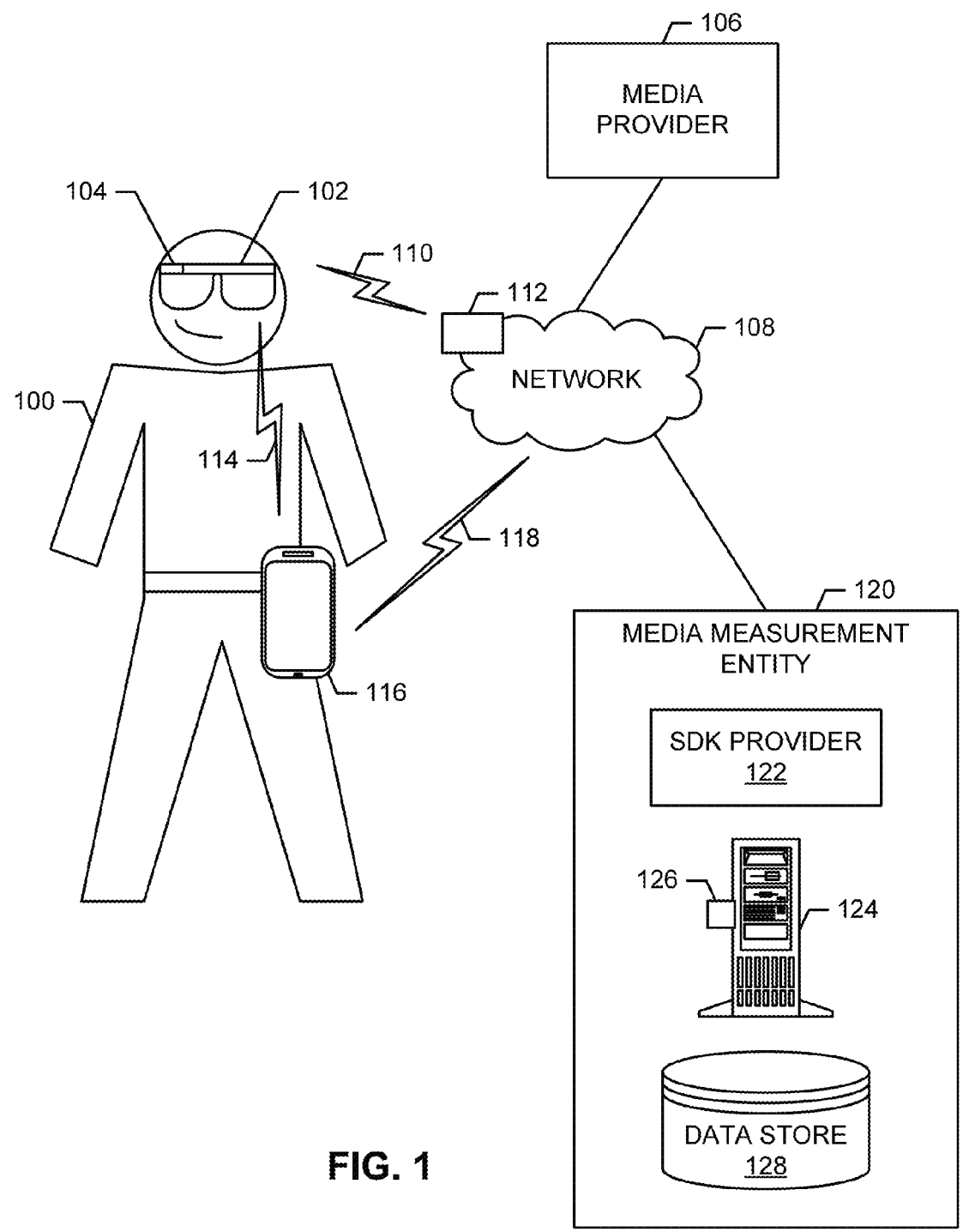
FIG. 1 illustrates an example environment including an example wearable media device having a meter constructed in accordance with teachings of this disclosure.

Media monitoring companies desire information related to user interactions with media devices. For example, media monitoring companies wish to obtain monitoring information related to media presented at the media devices such that the media monitoring entities gain knowledge of, for example, exposure to advertisements, exposure to content (e.g., programming, websites, etc.), user purchasing activity responsive to exposure to media, demographic information for audiences exposed to media, etc. As used herein, media refers to any form of content and/or advertisement delivered by any media (e.g., televisions, radios, tablets, smart phones, wearable media devices, etc.). Monitoring information includes, for example, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a panelist identifier, a username, etc.). Media identifying information may be aggregated to determine and/or estimate, for example, exposure of one or more populations and/or demographics to particular media and/or type(s) of media, ownership and/or usage statistics of media devices, relative rankings of usage and/or ownership of media devices, type(s) of use(s) of media devices (e.g., whether a device is used for browsing the Internet, streaming media from the Internet, etc.), and/or other type(s) of media device information. Traditionally, such systems treat each detected instance of media identifying similarly for purposes of, for example, calculating the exposure data (e.g., ratings) despite the fact that a first person associated with a first detection of media may be paying little or no attention to a presentation of the detected media while a second person associated with a second detection of the media may be focused on (e.g., highly attentive too and/or interacting with) the presentation of the media.

Examples disclosed herein recognize that although media may be detected on a media device, the presentation of the media does not necessarily indicate that the person is paying attention to (e.g., is engaged with) the media presentation. Examples disclosed herein generate engagement information (e.g., a likelihood of engagement) indicative of whether or not a user is paying attention to media presented on a wearable media device. Some wearable media devices have a head mounted display to present media (e.g., audiovisual media such as television programs, movies, streaming video, websites, advertisements, text messages, email, maps, augmented reality data, etc.) to a user on, for example, a portion (e.g., an upper right corner) of a reflective surface (e.g., a lens of glasses). As such, the user of the wearable media device is exposed to the displayed media while still interacting with a surrounding environment. Because the user of the wearable media device is able to perform tasks other than paying attention to (e.g., consuming) the displayed media more easily with the wearable media device, it is possible that the user is not paying attention to the displayed media.

To determine whether or not the user is engaged with (e.g., paying attention to) the displayed media and/or how likely it is that the user is paying attention to the displayed media, examples disclosed herein utilize characteristics of the display generated by the wearable media device. In examples disclosed herein, an opacity or transparency characteristic of the display is captured and utilized to generate, for example, an engagement score (e.g., a likelihood of engagement represented by a percentage) for the displayed media. While the display of the media on head mounted wearable media devices such as glasses is often fully opaque, in some scenarios the media is displayed with a degree of transparency. The degree of transparency can also be referred to as a degree or percentage of opacity as transparency and opaqueness are inversely related. The wearable media devices provide the transparent or semi-opaque display to enable the user to perceive his or her environment beyond the display of the media. Put another way, head mounted displays sometimes generate a display that is at least partially see-through such that the user can observe his or her surroundings while still being exposed to the media. As described in detail below, in some example wearable devices, the degree of transparency or opacity of the display on such head mounted displays is set according to, for example, a manual input provided by the user and/or an automatic detection of a gaze direction of the user relative to the media display. Examples disclosed herein utilize data representative of the degree of opacity of the display to determine a likelihood that the user is engaged with (e.g., is paying attention to) the corresponding media. An example measure of attentiveness for the user provided by examples disclosed herein is referred to herein as an engagement level or engagement score. In some examples disclosed herein, a greater degree of opacity (e.g., ninety percent opaque) of the display is translated into a higher engagement score for the corresponding media because (1) the manual input provided by the user corresponds to a desire to see the media clearly and/or (2) the user is likely looking at the display according to a gaze direction detector. In some examples disclosed herein, a lesser degree of opacity (e.g., 40 percent opaque) is translated into a lesser engagement score for the corresponding media because (1) the manual input provided by the user corresponds to a user increasing the transparency in view of a desire to see through the media (e.g., ignore or partially ignore) and/or (2) the user is likely looking away from the display according to the gaze direction detector.

In some examples disclosed herein, the degree of opacity of the display generated by the wearable media device is obtained by referencing one or more settings used by the wearable media device to generate the display. Additionally or alternatively, examples disclosed herein capture the opacity characteristic via an interface with the manual input (e.g., a button) accessible to the user during use of the wearable media device. Additionally or alternatively, examples disclosed herein capture the opacity characteristic from a gaze direction detector of the wearable media device that determines or sets the opacity of the media presentation based on whether the user is looking at or substantially at the media presentation. While the eye position information itself may be indicative of whether a user is paying attention to the displayed media, in some scenarios the user is looking in the direction of the media display but, at the same time, has provided a manual input to make the display transparent. Accordingly, some examples disclosed herein base engagement determinations solely on opacity characteristic data and/or prioritize the opacity characteristic data over eye position data. In some examples, the eye position data is not used and/or is not obtained.

In some examples disclosed herein, the engagement level or score is calculated by translating the opacity characteristic data into the engagement score based on a data structure (e.g., conversion table) having a plurality of mappings between degrees of opacity and engagement scores. In some examples disclosed herein, the engagement score is calculated according to one or more algorithms defined by, for example, a media measurement entity. In some examples disclosed herein, one or more algorithms combine the opacity characteristic data with additional or alternative data, such as sensor information (e.g., motion data, location data, facial expression data, eye tracking data, etc.) generated by the wearable media device, to generate the engagement score. That is, some examples disclosed herein consider additional factors in conjunction with the opacity characteristic data to generate engagement scores.

Engagement information provided by examples disclosed herein are used to, for example, generate engagement ratings for particular media presented on the wearable media devices. Traditional ratings that are generated using presence information are indications of exposure to media but are not indicative of whether audience member(s) actually paid attention to a media presentation (e.g., the person may be distracted from the media). Conversely, engagement information provided by examples disclosed herein can be used to generate engagement ratings indicative of how attentive users of wearable media devices were to specific pieces of media. Engagement ratings provided by examples disclosed herein can stand alone and/or be used to supplement traditional (e.g., solely exposure based) ratings. Compared to traditional ratings that are generated using only presence and/or media identifying information, engagement ratings provided by examples disclosed herein are more granular from multiple perspectives. For example, engagement levels disclosed herein provide information regarding attentiveness of wearable media device users to particular portions or events of media, such as a particular scene, an appearance of a particular actor or actress, a particular song being played, a particular product being shown, etc. Thus, engagement levels or scores provided by examples disclosed herein are indicative of, for example, how attentive audience member(s) become and/or remain when a particular person, brand, or object is present in the media, and/or when a particular event or type of event occurs in media. As a result, more granular data (relative to data provided by previous exposure only based systems) related to particular portions of media are provided by examples disclosed herein.

FIG. 1 illustrates and example environment including a user 100 wearing a wearable media device 102. In the example of FIG. 1, the wearable media device 102 includes a meter 104 constructed in accordance with teachings of this disclosure. As described in detail below, the example meter 104 uses opacity data related to a display of the wearable media device 102 to generate engagement information indicative of the level of attention being paid to media presented on the wearable media device 102. The example wearable media device 102 of FIG. 1 is capable of retrieving (e.g., downloading) any suitable type of media from any suitable source of media. For example, the wearable media device 102 of FIG. 1 communicates with a media provider 106 via a network 108 and/or direct communication to obtain media for display on the wearable media device 102. The example network 108 of FIG. 1 is a wide area network (WAN) such as the Internet. However, in some examples, local networks may additionally or alternatively be used. For example, multiple networks (e.g., a cellular network, an Ethernet network, etc.) may be utilized to implement the example network 108 of FIG. 1. The example media provider 106 of FIG. 1 may be implemented by any provider(s) of media such as a media broadcaster, multicaster, or unicaster (e.g., a cable television service, a fiber-optic television service, an IPTV provider, etc.), an on-demand digital media provider (e.g., a provider of an Internet streaming video and/or audio services such as Netflix®, YouTube®, Hulu®, Pandora®, Last.fm®, etc.), a web page, and/or any other provider of any type of electronic media.

In the illustrated example of FIG. 1, the wearable media device 102 is a head mounted display device such as, for example, Google Glass®. As such, the example wearable media device 102 of FIG. 1 is in communication with the example network 108 via, for example, a first wireless coupling 110 established with a Wi-Fi access point 112. Additionally or alternatively, the example wearable media device 102 of FIG. 1 communicates with the network 108 by way of a second wireless coupling 114 (e.g., a Bluetooth pairing, a Wi-Fi session) established with a portable device 116 having, for example, cellular capabilities. The example portable device 116 of FIG. 1 is, for example, a smart phone, a tablet, a phablet, a portable people meter, and/or any other portable device having wireless communication capabilities to communicate with the network 108. In such instances, the example wearable media device 102 of FIG. 1 communicates data to the portable device 116 via the second wireless coupling 114 and the portable device 116 relays the data to the network 108 over a third wireless coupling 118 (e.g., a cellular connection). In some examples, the wearable media device 102 of FIG. 1 utilizes the first wireless coupling 110 when the wearable media device 102 is within range of the Wi-Fi access point 112. When the example wearable media device 102 of FIG. 1 is not within range of the Wi-Fi access point 112 (or any other Wi-Fi access point and/or other type of short range communication device), the wearable device 102 of FIG. 1 utilizes the second wireless coupling 114 with the portable device 116 to communicate with the network 108.

In the illustrated example of FIG. 1, the meter 104 gathers information related to media presentations generated by the example wearable media device 102. In the example of FIG. 1, the example meter 104 (1) detects and/or measures engagement of users with media presentations, (2) detects and/or identifies media being presented on the wearable media device 102, and/or (3) detects and/or identifies users of the wearable media device 102. In the illustrated example of FIG. 1, the example meter 104 of FIG. 1 is software downloadable via, for example, the Internet. In the illustrated example of FIG. 1, the meter 104 is provided by a media measurement entity 120 (e.g., a monitoring entity, such as The Nielsen Company) and/or the example media provider 106. For example, the media measurement entity 120 of FIG. 1 includes an SDK (software development kit) provider 122 that provides instructions to application developers associated with, for example, the media provider 106. In some examples, the SDK provider 122 provides an SDK to the application developers such that the developers can integrate monitoring instructions (e.g., including instructions to implement the example meter 104) into existing applications. In such instances, the media provider 106 employs the SDK to integrate the meter 104 into an application associated with the media provider 106 (e.g., by instrumenting the application with instructions of the SDK corresponding to the meter 104) and posts the instrumented application having the meter 104 integrated therein to, for example, an app store (e.g., Apple iTunes, Google play, etc). In some examples, the instrumented application has a primary function different than media monitoring such as, for example, presenting media from a particular provider (e.g., when the instrumented application is dedicated to a particular media provider (e.g., a television broadcaster such as ESPN, ABC, NBC, etc.)).

Members of the general public, some of whom are panelists of the media measurement entity 120, may download the meter 104 (e.g., from an app store) to respective media device(s), such as the example wearable media device 102 of FIG. 1. People become panelists via, for example, a user interface presented on the wearable media device 102 (e.g., a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). During enrollment of the panelists, the media measurement entity 120 of FIG. 1 receives demographic information from the enrolling people so that subsequent correlations may be made between media exposure associated with those panelists and different demographic markets.

While in the illustrated example of FIG. 1 the meter 104 is provided via an SDK, the meter 104 and/or the corresponding instructions provided via the SDK may be provided in any other suitable manner. For example, instructions associated with the example meter 104 of FIG. 1 may be provided as an application programming interface (API), a plugin, an add-on, etc. Alternatively, the instructions associated with the example meter 104 may be maintained externally and the SDK may facilitate installation of a link to the monitoring instructions into one or more applications. This later approach is advantageous because it makes implementing the monitoring instrumentation after the corresponding application is deployed easy.

As described in detail below in connection with FIGS. 5 and 6, the example meter 104 of FIG. 1 collects monitoring data (e.g., media identifying information, user identifying information, device identifying information, etc.), generates engagement information indicative of attention paid to the display of the wearable media device 102, and transmits a record including the monitoring data and the engagement information to the example media measurement entity 120 (e.g., via communication interfaces of the wearable media device 102 and the network 108). To exchange information with the media device 102 via the network 104, the example media measurement entity 120 employs a server 124 (and/or any other suitable computing platform) that implements an interface 126 to receive reported monitoring information from, for example, the wearable media device 102 via the network 108. The example interface 126 of FIG. 1 is a Hyper Text Transfer Protocol (HTTP) interface. However, the example server 124 of FIG. 1 may utilize any suitable type(s) of interface(s) and/or protocol(s). In the illustrated example, the HTTP interface 126 receives HTTP requests that include, for example, media monitoring information. In some examples, the HTTP requests are sent with the media monitoring information in a payload portion of the requests. The media monitoring information received via the HTTP requests includes, for example, media-identifying information (e.g., media-identifying metadata, codes, signatures, watermarks, and/or other information that may be used to identify presented media), user identifying information (e.g., an alphanumeric identifier assigned to the current user), device identifying information (e.g., model number, manufacturer identification, version information, etc.), application usage information (e.g., an identifier of an application, a time and/or duration of use of the application, a rating of the application, etc.), engagement information generated by the example meter 104, and/or any other suitable monitoring information. The requests may not be intended to actually retrieve media, but are instead used as a vehicle to convey the media monitoring information. Thus, the HTTP requests may be referred to as "dummy requests". The example server 124 of FIG. 1 is provided with software (e.g., a daemon) to extract the media monitoring information from the payload of the dummy request(s). Additionally or alternatively, any other method(s) to transfer the media monitoring information may be used such as, for example, an HTTP Secure protocol (HTTPS), a file transfer protocol (FTP), a secure file transfer protocol (SFTP), an HTTP and/or HTTPS GET request, an HTTP and/or HTTPS POST request, etc.

The example media measurement entity 120 of FIG. 1 employs a data store 128 that is implemented by one or more storage devices such as, for example, flash memory, magnetic media, optical media, etc. The data stored in the example data store 128 of FIG. 1 may be in any data format such as, for example, binary data, comma delimited data, tab delimited data, structured query language (SQL) structures, etc. While in the illustrated example of FIG. 1 the data store 128 is illustrated as a single database, the data store 128 may be implemented by multiple databases, and/or may be stored in multiple memory locations. The example data store 128 of FIG. 1 stores, for example, the engagement information and the monitoring information received from the example meter 104 of FIG. 1. In some examples, the data store 128 stores personally identifying information (e.g., demographic information, bibliographic information, etc.) in connection with, for example, one or more panelists and/or other people indicative of one or more characteristics of the corresponding person.

Although for simplicity, the above discussion focuses on a single wearable media device 102, a single meter 104, a single media provider 106, and a single media measurement entity 120, any number of any of these elements may be present. For example, in a typical implementation, it is expected that the media measurement entity 120 will offer multiple different meters 104 to the public at large. Thus, it is expected that there will be many media devices accessing metered applications, and that a significant portion of the users accessing such applications will agree to be panelists. Thus, it is expected that there will be many instances of the above processes conducted across many devices at overlapping and/or distinct times. Thus, for example, there may be many instantiations of the machine-readable instructions disclosed in the below flowcharts operating at the same and/or different times. Some of these instances may be implemented as parallel threads operating on a same device.

Figure 2:
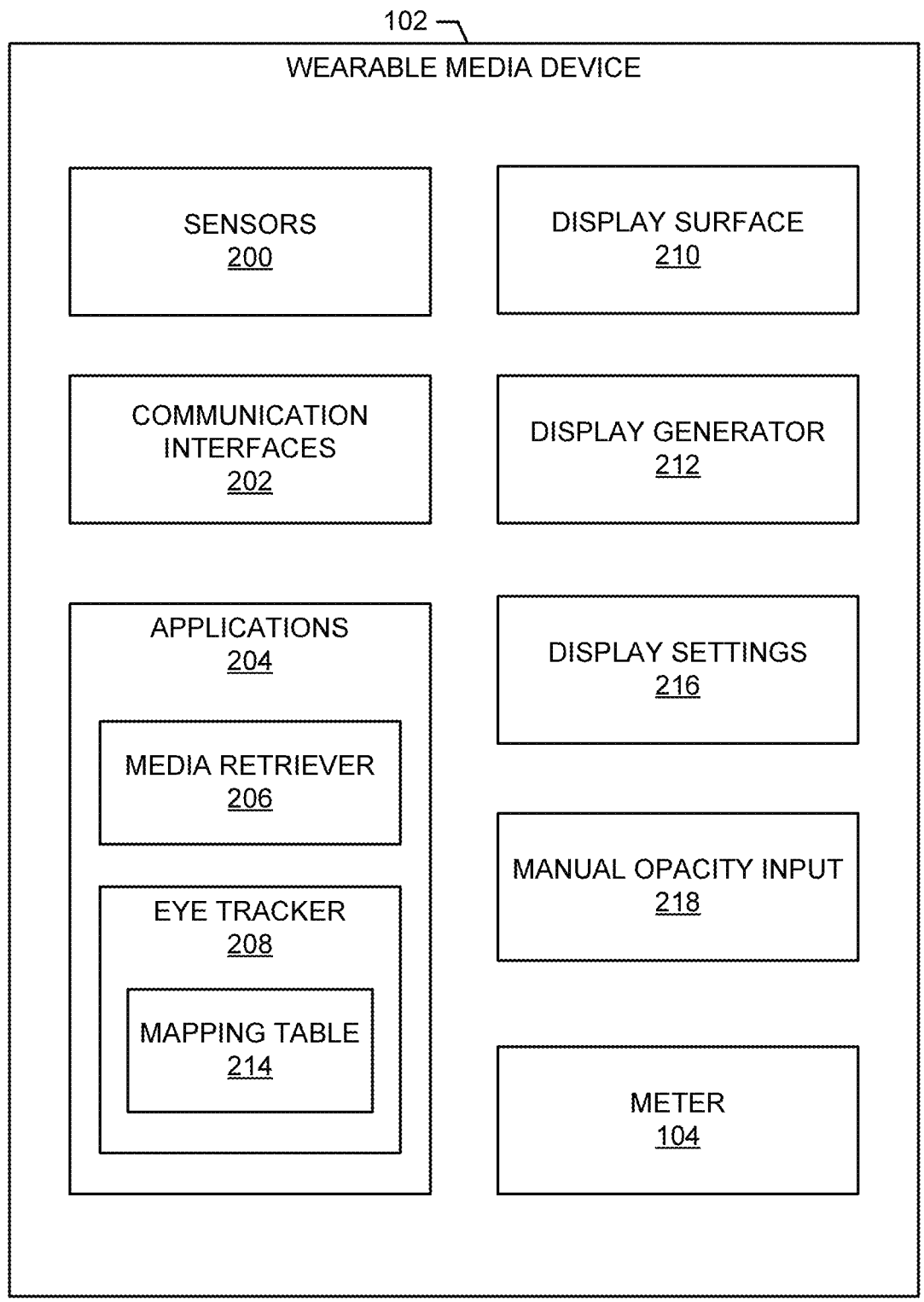
FIG. 2 is a block diagram of an example implementation of the example wearable media device of FIG. 1.

FIG. 2 is a block diagram of an example implementation of the example wearable media device 102 of FIG. 1. The example wearable media device 102 of FIG. 2 includes sensors 200 to monitor an environment in which the wearable media device 102 is located and/or to monitor activity of the wearable media device 102. The sensors 200 of FIG. 2 include, for example, motion sensor(s), accelerometer(s), location tracker(s) (e.g., a global positioning system module), audio sensor(s), touch sensor(s), image capturer(s), and/or any other suitable sensor(s) and/or device(s) to collect information related to the wearable media device 102. In some examples, the sensors 200 include an image capturing sensor to obtain image information indicative of a gaze direction of the user. For example, the gaze direction of the user is calculated by determining a direction at which a center of an eye is pointed. As described below, the gaze direction of the user may be used to control the opacity characteristic of displayed media.

The example wearable media device 102 of FIG. 2 includes communication interfaces 202 to facilitate, for example, the communications described above in connection with FIG. 1. For example, the communication interfaces 202 of FIG. 2 include a Wi-Fi interface to communicate with available (e.g., within range) Wi-Fi access points. Accordingly, the example communication interfaces 202 of FIG. 2 facilitate the first example wireless coupling 110 described above in connection with FIG. 1. In some instances, a Wi-Fi communication interface 202 is additionally or alternatively utilized to facilitate the second example wireless coupling 114 of FIG. 1 with the example portable device 116. Additionally or alternatively, the example communication interfaces 202 of FIG. 2 include a Bluetooth interface to facilitate, for example, the first and/or second example wireless couplings 110, 114 of FIG. 1. In some examples, the communication interfaces 202 of FIG. 2 include one or more wired interfaces to exchange information over a cable and/or to receiver a charge from a power source.

The example wearable media device 102 of FIG. 2 includes one or more applications 204 to be executed on the example wearable media device 102. As described above, the example wearable media device 102 of FIG. 2 can download any number and/or type(s) of application(s) (e.g., an email application, a text messaging application, a map application, a browser, an augmented reality application, etc.) from, for example, an app store. The example applications 204 of FIG. 2 include a media retriever 206 and an eye tracker 208. The example media retriever 206 of FIG. 2 obtains media from any suitable source such as, for example, the media provider 106 of FIG. 1. The example media retriever 206 of FIG. 2 implements, for example, a web browser (e.g., Google Chrome®), a streaming service (e.g., Pandora®), and/or an on-demand program (e.g., Netflix®) to facilitate retrieval of the media. The example media retriever 206 of FIG. 2 receives requests (e.g., inputs from the user) for particular media and submits one or more queries to the appropriate source of media such that the media is delivered to the wearable media device 102.

The example eye tracker 208 of FIG. 2 uses a detected gaze direction of the user to control the opacity of media displayed on a display surface 210 of the wearable media device 102. The example eye tracker 208 of FIG. 2 utilizes eye position and/or movement data provided by one or more of the sensors 200 to determine or estimate the gaze direction of the user and whether the estimated gaze direction corresponds to a portion of the display surface 210 (e.g., a segment of a lens) designated for the display of media. That is, the example eye tracker 208 of FIG. 2 categorizes how closely a gaze of the user is to media being presented on the display surface 210. In the illustrated example of FIG. 2, the eye tracker 208 calculates an angular difference (e.g., an angle of a certain degree) between a direction of the detected gaze and a direct line of sight between the eye(s) of the user and the designated display portion of the display surface 210. In the illustrated example of FIG. 2, the eye tracker 208 uses a magnitude of the angular difference to provide instructions to a display generator 212 of the wearable media device 102 regarding a degree of opacity for the display of media. For example, the eye tracker 208 of FIG. 2 queries a reference table 214 including mappings between angular differences (between the detected gaze direction and the direction corresponding to the designated media display portion of the display surface) and degrees of opacity for currently displayed media. Using the mappings table 214, the example eye tracker 208 of FIG. 2 selects a degree of opacity for the display to correspond with the detected gaze direction (e.g., looking away from the displayed media, looking in the general vicinity of the displayed media, looking directly at the displayed media, etc.). In the illustrated example of FIG. 2, the mappings table 214 includes high degrees of opacity (e.g., eighty to one hundred percent opacity) for instances when the user is looking directly at the designated media display portion of the display surface 210.

Additionally, the example mappings table 214 of FIG. 2 includes moderate degrees of opacity (e.g., fifty to eighty percent opacity) for instances when the user is looking in the general vicinity of the designated media display portion of the display surface 210. Additionally, the example mappings table 214 of FIG. 2 includes low degrees of opacity (e.g., twenty-five to fifty percent opacity) for instances when the user is looking away from the designated media display portion of the display surface 210.

Figure 3:
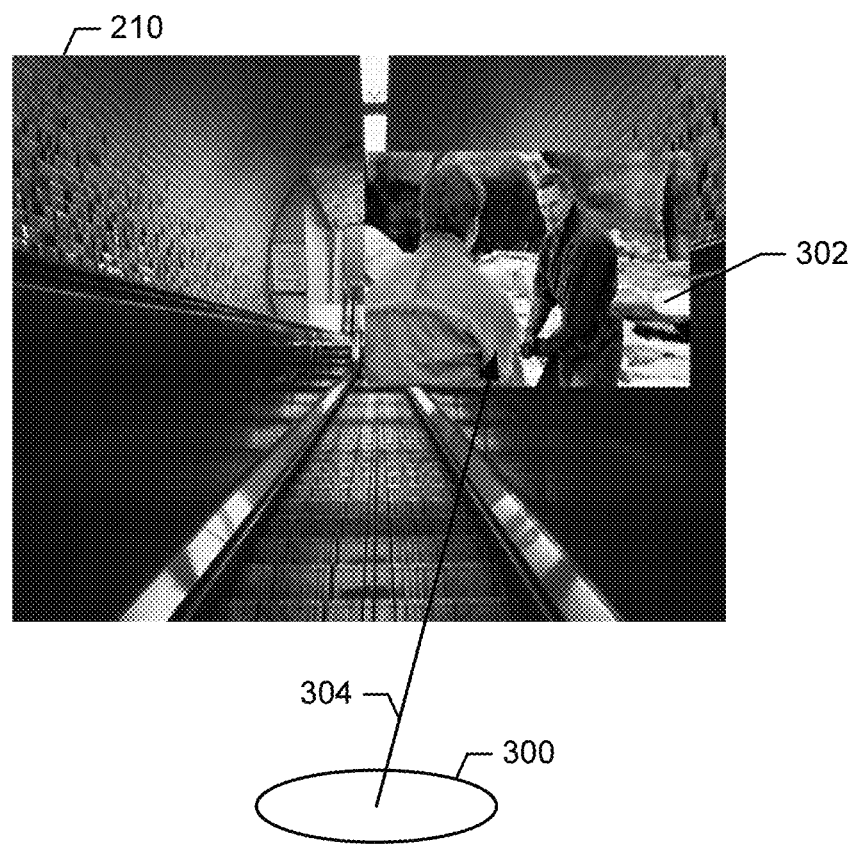
FIG. 3 is a screen shot representative of a first view seen through the example wearable media device of FIGS. 1 and/or 2 with media being presented at a first opacity.

FIG. 3 illustrates an instance of the eye tracker 208 of FIG. 2 determining that the eye(s) 300 of the user are looking directly at a media display portion 302 of the display surface 210 of the wearable media device 102. At a time corresponding to the example of FIG. 3, the example eye tracker 208 of FIG. 2 determines that a gaze direction 304 of the user is directed at the media display portion 302. Accordingly, the example media of the display portion 302 in FIG. 3 has a high degree of opacity (e.g., one hundred percent opacity).

Figure 4:
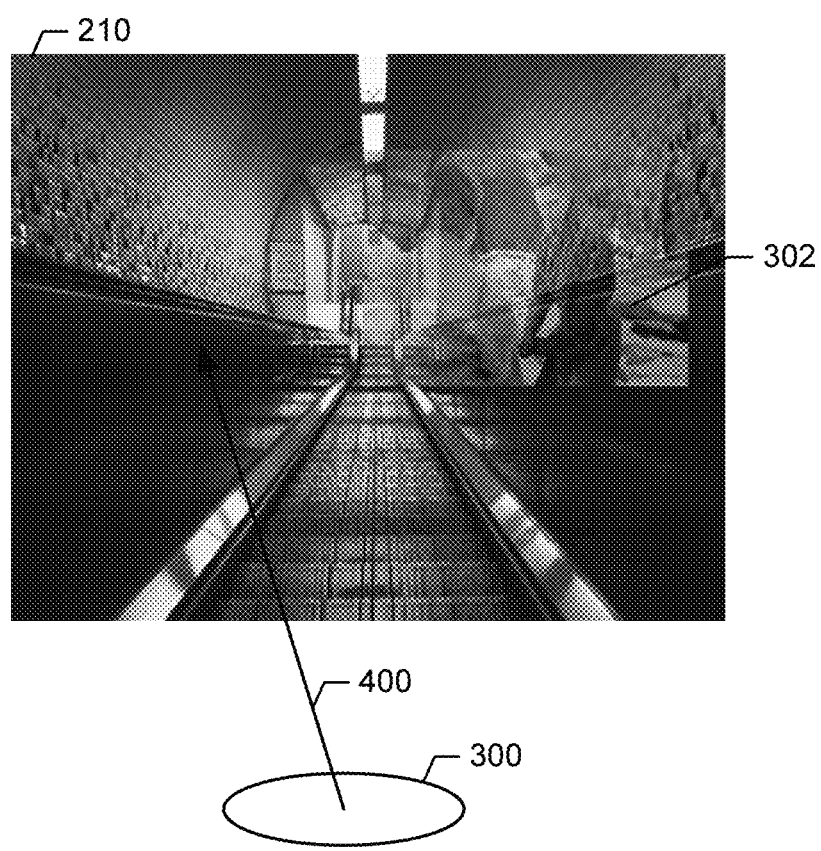
FIG. 4 is a screen shot representative of a second view seen through the example wearable media device of FIGS. 1 and/or 2 with media being presented at a second opacity.

FIG. 4 illustrates an instance of the eye tracker 208 of FIG. 2 determining that the eye(s) 300 of the user are looking away from the media display portion 302 of the display surface 210 of the wearable media device 102. At a time corresponding to the example of FIG. 4, the example eye tracker 208 of FIG. 2 determines that a gaze direction 400 of the user is directed away from the media display portion 302. Accordingly, the example media of the display portion 302 in FIG. 4 has a low degree of opacity (e.g., twenty-five percent opacity).

The example eye tracker 208 of FIG. 2 conveys the opacity setting (e.g., opacity percentage) obtained from the mappings table 214 to the display generator 212, which facilitates the display of media on the display surface 210 in accordance with the received opacity setting. Further, the example eye tracker 208 of FIG. 2 conveys the obtained opacity setting to display settings 216 that are utilized by the example display generator 212 to generate the display of media on the display surface 210. That is, the example display settings 216 of FIG. 2 include an entry (e.g., a variable, a file, etc.) dedicated to tracking a current degree of opacity of the displayed media on the display surface 210.

The example wearable media device 102 of FIG. 2 includes a manual opacity input 218 that is accessible to the user of the wearable media device 102. For example, the manual opacity input 218 of FIG. 2 is implemented by a button on a frame of the wearable media device 102 and/or by an on screen menu presented on the display surface 210 from which a selection is made by the user. The example manual opacity input 218 of FIG. 2 enables the user to instruct the display generator 212 to display media at a particular degree of opacity. The instructions provided via the example manual opacity input 218 are stored in the example display settings 216. In some examples, the manual opacity input 218 of FIG. 2 toggles across a range of degrees of opacity (which may include predetermined values). Additionally or alternatively, the example manual opacity input 218 provides a field or a prompt for the user to enter a specific number (e.g., percentage) for the opacity of the displayed media. In the illustrated example of FIG. 2, the example display generator 212 uses the provided input to generate the display of media on the display surface 210. In the example of FIG. 2, the display generator 212 prioritizes the instructions provided by the manual opacity input 218 over the settings provided by the example eye tracker 208. However, any suitable combination and/or priority arrangement is possible.

As explained above, the example wearable media device 102 of FIG. 2 displays media on the display surface 210 in accordance with the display settings 216, which includes an indication of a degree of opacity of the displayed media. As described below, the example meter 104 obtains and utilizes the opacity information to generate engagement information for the media being displayed on the display surface 210.

While an example manner of implementing the wearable media device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example communication interfaces 202, the example applications 204, the example media retriever 206, the example eye tracker 208, the example display generator 212, and/or the example meter 104 may be implemented by hardware, software, firmware and/or any combination of hardware, software and/or firmware. Thus, for example, any of the example communication interfaces 202, the example applications 204, the example media retriever 206, the example eye tracker 208, the example display generator 212, and/or the example meter 104 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interfaces 202, the example applications 204, the example media retriever 206, the example eye tracker 208, the example display generator 212, and/or the example meter 104 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example wearable media device 102 of FIG. 2 may include one or more elements, processes and/or devices in addition to, or instead of, those illustrated in FIG. 2, and/or may include more than one of any or all of the illustrated elements, processes and devices.

Figure 5:
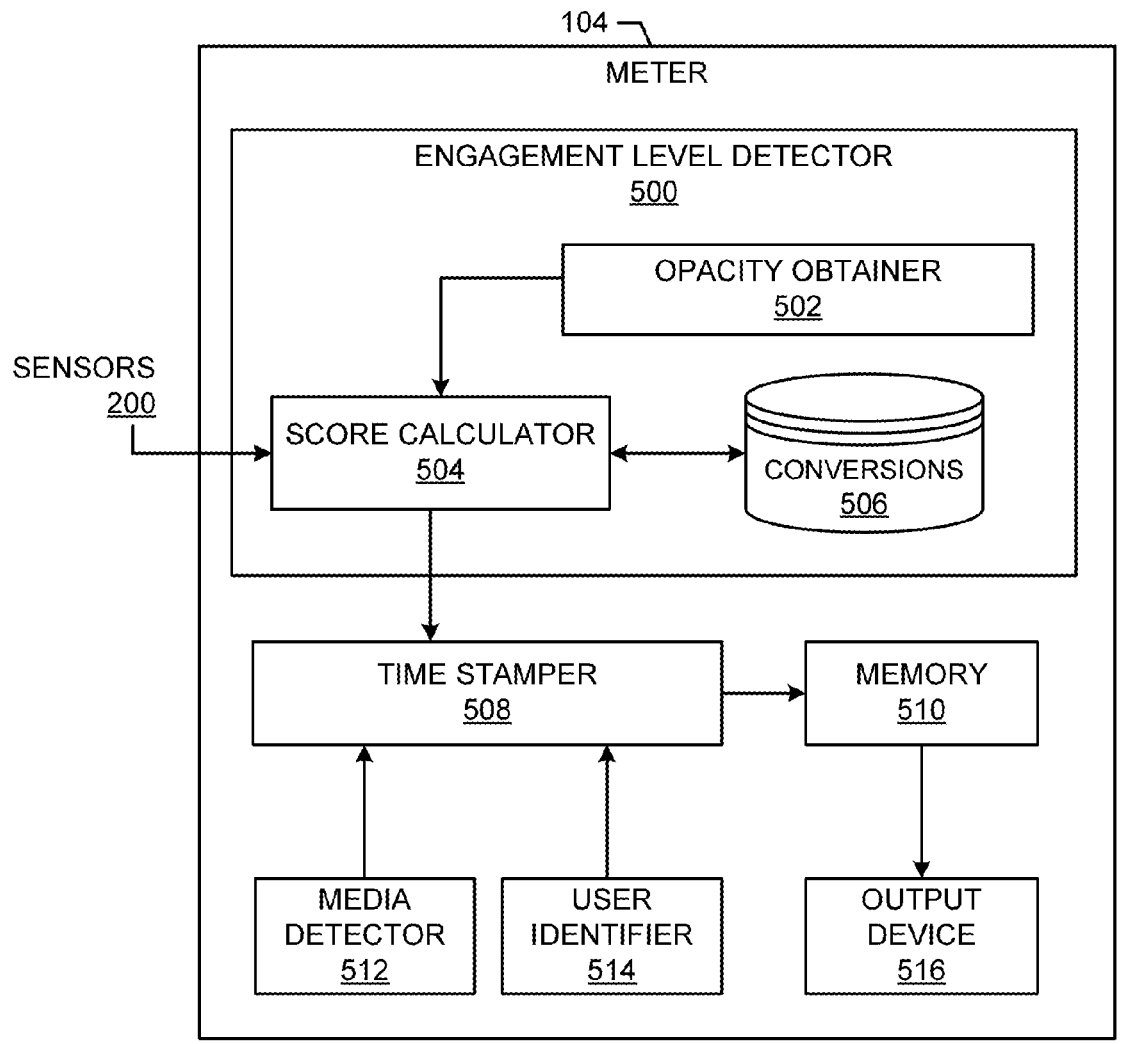
FIG. 5 is a block diagram of an example implementation of the example meter of FIGS. 1 and/or 2.

FIG. 5 is a block diagram of the example meter 104 of FIGS. 1 and/or 2. The example meter 104 of FIG. 5 includes an engagement level detector 500 to detect and/or measure a level of engagement (e.g., a likelihood that the user is paying attention) with media being presented on the example wearable media device 102 of FIGS. 1 and/or 2. The example engagement level detector 500 of FIG. 5 includes an opacity obtainer 502 to obtain opacity information associated with the display generated by the wearable media device 102, a score calculator 504 to receive data from the opacity obtainer 500, and one or more conversions 506 to be used by the score calculator 504. The example opacity obtainer 502 of FIG. 5 captures display characteristic data from the wearable media device 102. In some examples, the opacity obtainer 502 communicates with (e.g., queries and receives response from) the example display settings 216 stored in memory of the wearable media device 102. As described above, the example display settings 216 include instructions and/or settings referenced by the display generator 212, which uses the display settings 216 to generate a display of media having a particular degree of opacity. In such instances, the example opacity obtainer 502 of FIG. 5 recognizes and/or interprets the display settings 216 as corresponding to a particular degree of opacity and provides corresponding data to the example score calculator 504 of FIG. 4. Additionally or alternatively, the example opacity obtainer 502 of FIG. 5 obtains opacity information by interfacing with the example manual opacity input 218 of the wearable media device 102. That is, the example opacity obtainer 502 of FIG. 5 receives one or more signals from the manual opacity input 218 when, for example, the user presses a button corresponding to the manual opacity input 218 and/or makes a selection from an on-screen menu corresponding to the manual opacity input 218. In such instances, the example opacity obtainer 502 of FIG. 5 recognizes and/or interprets the received signal(s) as corresponding to a particular degree of opacity and provides the data to the example score calculator 504 of FIG. 5. Additionally or alternatively, the example opacity obtainer 502 of FIG. 5 obtains opacity information by interfacing with the example eye tracker 206 of the wearable media device 102. That is, the example opacity obtainer 502 of FIG. 5 receives one or more signals from the eye tracker 208 when, for example, the gaze direction of the user is calculated. In such instances, the example opacity obtainer 502 of FIG. 5 recognizes and/or interprets the received signal(s) as corresponding to a particular degree of opacity and provides the data to the example score calculator 504 of FIG. 5.

The example score calculator 504 of FIG. 5 uses data representative of the degree of opacity provided by the example opacity obtainer 502 to generate an attentiveness metric (e.g., engagement level) for the user. In the illustrated example of FIG. 5, the engagement level calculated by the score calculator 504 is a likelihood that the user is paying attention to the media presented on the display surface 210 of the wearable media device 102. The metric generated by the example score calculator 504 of FIG. 5 is any suitable type of value such as, for example, a numeric score based on a scale, a percentage, a categorization, one of a plurality of levels defined by respective thresholds, etc. In some examples, the metric generated by the example score calculator 504 of FIG. 5 is an aggregate score or percentage (e.g., a weighted average) formed by combining a plurality of individual engagement scores or percentages based on different data and/or detections corresponding to, for example, successive intervals.

In the illustrated example of FIG. 5, the score calculator 504 utilizes the provided degree of opacity to determine or estimate whether, for example, the user is paying attention to the displayed media. The example score calculator 504 of FIG. 5 calculates a score (e.g., a likelihood) representative of whether the user is paying attention to the displayed media based on the conversions 506. For example, the score calculator 504 of FIG. 5 compares the received degree of opacity to one or more thresholds stored in the conversions 506 to select one of a plurality of engagement scores. For example, the conversions 506 of FIG. 5 include a table in which certain ranges of degrees of opacity correspond to certain engagement scores. Table 1 is an example illustration of the example conversions 506 of FIG. 5.

TABLE 1

| Degree of Opacity (%) | Engagement Score |
|---|---|
| 100 | 10 |
| 90-99 | 9 |
| 80-89 | 8 |
| 70-79 | 7 |
| 60-69 | 6 |
| 50-59 | 5 |
| 40-49 | 4 |
| 30-39 | 3 |

TABLE 1-continued

| Degree of Opacity (%) | Engagement Score |
|---|---|
| 20-29 | 2 |
| 10-19 | 1 |
| 0-9 | 0 |

As shown in Table 1, the user is assigned a greater engagement score when the degree of opacity is high. While the engagement scores of Table 1 are whole numbers, additional or alternative types of scores are possible, such as percentages.

Additionally or alternatively, the example score calculator 504 of FIG. 5 translates the precise degree of opacity into a specific engagement score using any suitable algorithm or equation. In other words, the example score calculator 504 of FIG. 5 may directly translate a degree of opacity into an engagement score in addition to or in lieu of using a range of potential degrees (e.g., according to Table 1 of the conversions) to assign a score to the corresponding user. In such instances, the example conversions 506 include one or more algorithms or functions that receive the degree of opacity as input and that output, for example, a numerical representation of a likelihood of engagement. For example, the conversions 506 receive a first percentage of opacity and generate a second percentage indicative of a likelihood that the user is engaged with the displayed media. In such instances, higher percentages indicate proportionally higher levels of attention or engagement.

In some examples, the example score calculator 504 of FIG. 5 considers data collected by, for example, the sensors 200 of the wearable media device 102 in conjunction with the opacity characteristic data provided by the opacity obtainer 502. For example, the conversions 506 of FIG. 5 include one or more algorithms to combine the opacity characteristic data with additional or alternative data, such as sensor information (e.g., motion data, location data, facial expression data, etc.) generated by the sensors 200 of the wearable media device 102, to generate the engagement score. The example score calculator 504 may consider additional factors in conjunction with the opacity characteristic data to generate engagement scores.

In some examples, the score calculator 504 of FIG. 5 combines calculations taken in connection with a plurality of intervals. For example, the likelihoods of engagement calculated by the example score calculator 504 of FIG. 5 can be combined (e.g., averaged) for a period of time spanning a plurality of frames of media to generate a collective likelihood that the user was engaged with the media for the period of time. Detecting that the user likely paid attention to the media through multiple consecutive frames may indicate a higher likelihood of engagement with the displayed media, as opposed to indications that the user frequently switched to, for example, lower degrees of opacity. For example, the score calculator 504 may calculate a percentage representative of a likelihood of engagement for each of twenty consecutive frames of media. In some examples, the score calculator 504 calculates an average of the twenty percentages and compares the average to one or more thresholds, each indicative of an engagement score as described above in connection with Table 1. Depending on the comparison of the average to the one or more thresholds, the example score calculator 504 determines a likelihood or categorization of the engagement of the user for the period of time corresponding to the twenty frames.

The example score calculator 504 of FIG. 5 outputs the calculated score to an example time stamper 508. The example time stamper 508 of FIG. 5 includes a clock and a calendar. The example time stamper 508 of FIG. 5 associates a time period (e.g., 1:00 a.m. Central Standard Time (CST) to 1:01 a.m. CST) and date (e.g., Jan. 2, 2014) with each calculated engagement score by, for example, appending the period of time and data information to an end of the data. A data package (e.g., the engagement score, the degree of opacity and the time stamp) is stored in memory 510. In the illustrated example, the memory 510 is memory of the wearable media device 102. The example memory 510 of FIG. 5 includes, for example, a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 510 may include one or more double data rate (DDR) memories, such as DDR, DDR2, DDR3, mobile DDR (mDDR), etc.

The example time stamper 508 of FIG. 5 also receives data from an example media detector 512 and an example user identifier 514. The example media detector 512 of FIG. 5 detects presentation(s) of media on the wearable media device 102 and/or collects identification information associated with the detected presentation(s). In some examples, the media detector 512 comprises an instrumented application that extracts, for example, codes and/or watermarks embedded in media presented by the wearable media device 102. Audio watermarking is a technique used to identify media such as television programs, radio broadcasts, advertisements, downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Additionally or alternatively, the example media detector 512 of FIG. 5 facilitates generation of fingerprints and/or signatures representative of media presented on the wearable media device 102. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the code/watermark is transmitted with and/or in association with the media as media-identifying metadata. The media-identifying metadata may be formatted in a text or binary format such as, for example, an ID3 tag. In some examples, the media-identifying metadata includes the data from the code/watermark, etc. However, in some other examples, the media-identifying metadata is derived from and/or representative of the code/watermark, and/or a signature, etc. Example methods and apparatus to transcode watermarks into ID3 tags are disclosed in U.S. patent application Ser. No. 13/341,646, U.S. patent application Ser. No. 13/341,661, U.S. patent application Ser. No. 13/443, 596, U.S. patent application Ser. No. 13/455,961, U.S. patent application Ser. No. 13/341,646, and U.S. patent application Ser. No. 13/472,170 which are hereby incorporated by reference in their entireties.

In the illustrated example of FIG. 5, the monitoring functionality of the media detector 512 stores data associated with and/or representative of the collected information in, for example, the memory 510 and/or transmits the collected monitoring information to the example media measurement entity 120 of FIG. 1. In some examples, the wearable media device 102 includes additional or alternative monitoring functionality (e.g., native monitoring functionality and/or monitoring software other than the software of the media detector 512). In some examples, the monitoring functionality of the media detector 512 and/or other monitoring functions operating on the wearable media device 102 are referred to as "on-device meters." The example media detector 512 of FIG. 5 provides the media identifying information to the example time stamper 508.

To determine an identity of the user of the wearable media device 102, the example meter 104 of FIG. 5 includes a user identifier 514. The example user identifier 514 of FIG. 5 determines an identity of the user based on, for example, user identifying information stored the memory 510 of the example wearable media device 102 in connection with, for example, registration of the wearable media device 102 and/or installation of the example meter 104 on the example wearable media device 102. For example, when the user registers to participate in a monitoring panel associated with the media measurement entity 120 of FIG. 1, the user is assigned an identifier (e.g., alphanumeric string), which is stored on the wearable media device 102. In such instances, the example user identifier 514 of FIG. 5 references the stored identifier to obtain the user identifying information. Additionally or alternatively, the example user identifier 514 of FIG. 5 utilizes log on information provided when the user initiates a session with (e.g., unlocks) the wearable media device 102. The example user identifier 514 of FIG. 5 employs any other suitable technique (e.g., facial recognition data provided by an application of the wearable media device 102) to identify the current user. The example user identifier 514 of FIG. 5 provides the user identifying information to the example time stamper 508.

In the illustrated example of FIG. 5, an output device 516 periodically and/or aperiodically exports data (e.g., media identification information, user identification information, engagement scores, etc.) from the memory 510 to, for example, the media measurement entity 120 of FIG. 1 (e.g., via the network 108). In the illustrated example, the output device 516 utilizes the communication abilities (e.g., the communication interface(s) 202) of the wearable media device 102 to convey information. In the illustrated example of FIG. 5, the media measurement entity 120 (e.g., The Nielsen Company (US), LLC) utilizes the data generated by the meter 104 to generate, for example, exposure information such as engagement ratings, traditional exposure/audience composition ratings (e.g., Nielsen ratings), etc. The information from many meters may be compiled and analyzed to generate ratings representative of media exposure by one or more populations of interest.

While an example manner of implementing the meter 104 is illustrated in FIG. 5, one or more of the elements, processes and/or devices illustrated in FIG. 5 may be combined, divided, re-arranged, omitted, eliminated and/or implemented in any other way. Further, the example engagement level detector 500, the example opacity obtainer 502, the example score calculator 504, the example time stamper 508, the example media detector 512, the example user identifier, the example output device 516, and/or, more generally, the example meter 104 of FIG. 5 may be implemented by hardware, software, firmware and/or any combination of hardware, software and/or firmware. Thus, for example, any of the example engagement level detector 500, the example opacity obtainer 502, the example score calculator 504, the example time stamper 508, the example media detector 512, the example user identifier, the example output device 516, and/or, more generally, the example meter 104 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example engagement level detector 500, the example opacity obtainer 502, the example score calculator 504, the example time stamper 508, the example media detector 512, the example user identifier, the example output device 516, and/or, more generally, the example meter 104 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 104 of FIG. 5 may include one or more elements, processes and/or devices in addition to, or instead of, those illustrated in FIG. 5, and/or may include more than one of any or all of the illustrated elements, processes and devices.

Figure 6:
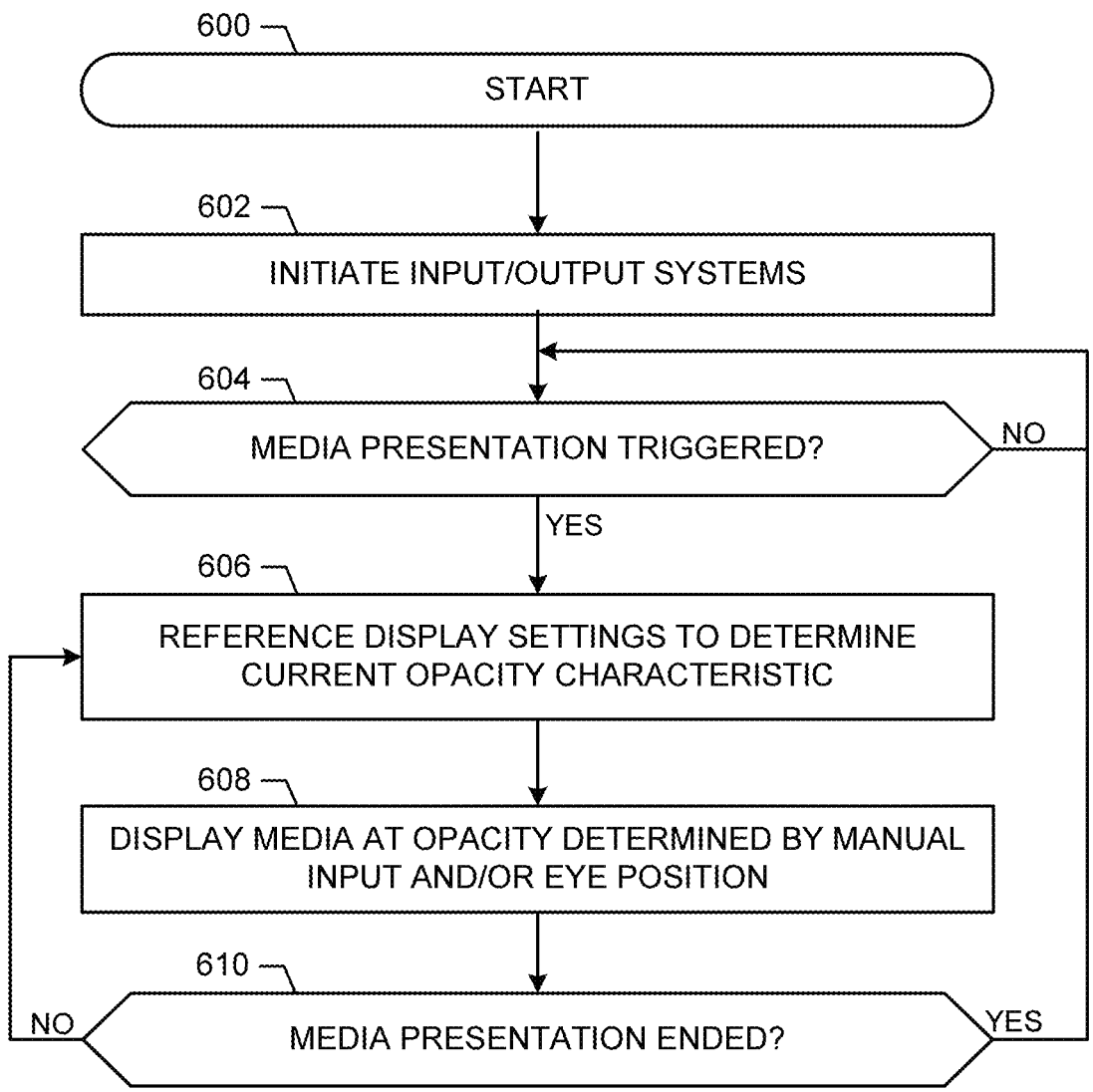
FIG. 6 is a flowchart representative of example machine-readable instructions that may be executed to implement the example wearable media device of FIGS. 1 and 2.
Figure 7:
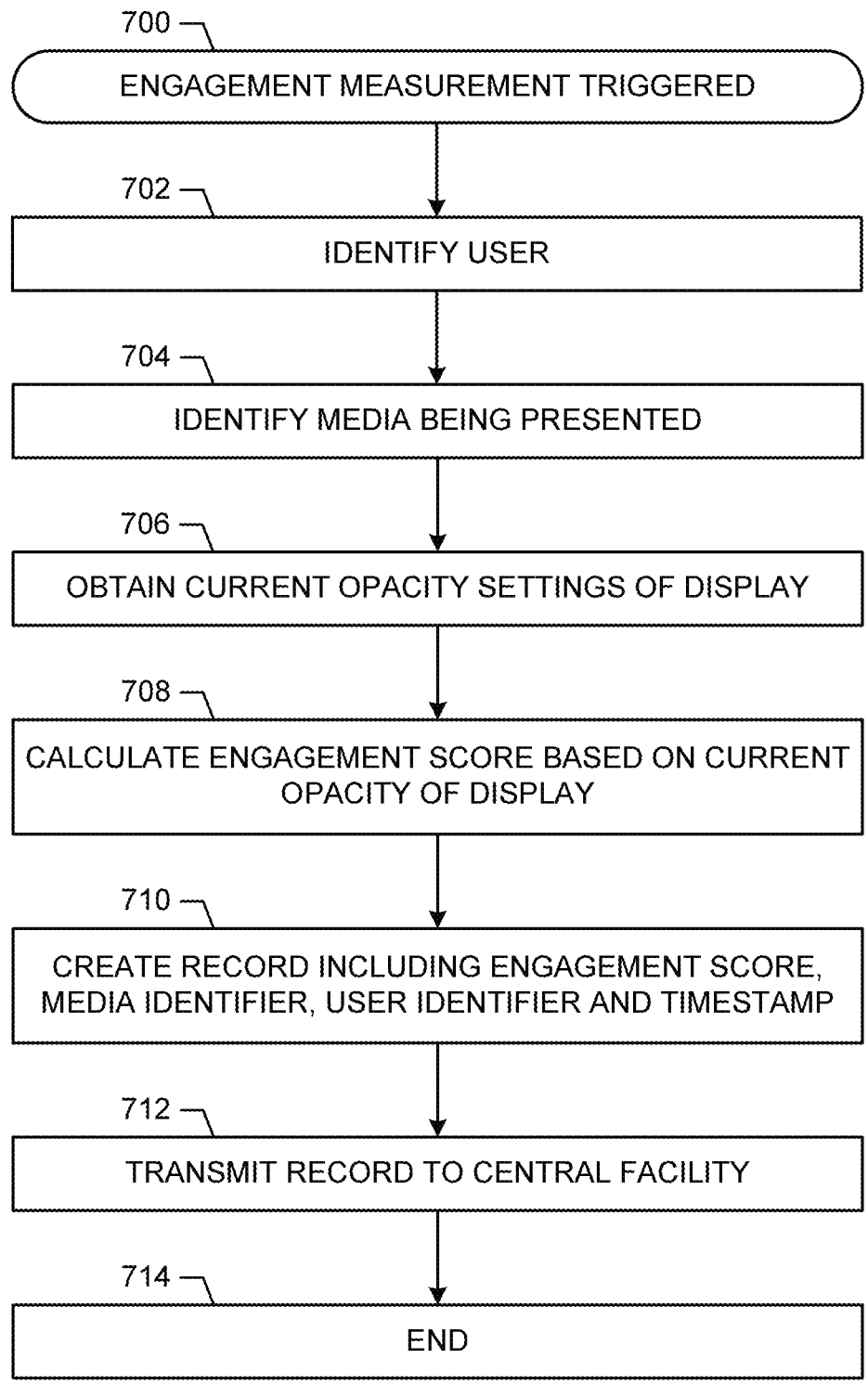
FIG. 7 is a flowchart representative of example machine-readable instructions that may be executed to implement the example meter of FIGS. 1, 2 and/or 5.
Figure 8:
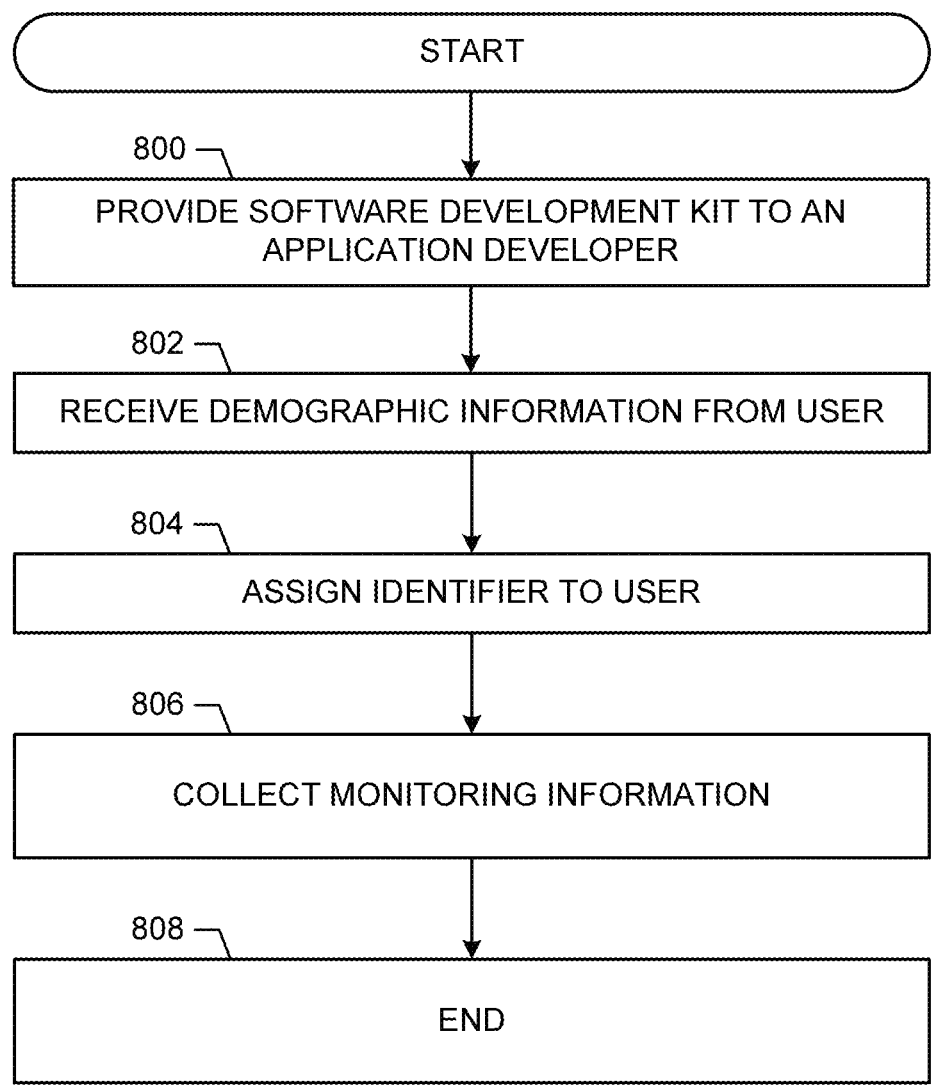
FIG. 8 is a flowchart representative of example machine-readable instructions that may be executed to implement the example media measurement entity of FIG. 1.

A flowchart representative of example machine readable instructions for implementing the example wearable media device 102 represented in FIGS. 1 and/or 2 is shown in FIG. 6. A flowchart representative of example machine readable instructions for implementing the example meter 104 represented in FIGS. 1, 2 and/or 5 is shown in FIG. 7. A flowchart representative of example machine readable instructions for implementing the example media measurement entity 120 of FIG. 1 is shown in FIG. 8. In these examples, the machine readable instructions comprise programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowchart illustrated in FIGS. 6-8, many other methods of implementing the example wearable media device 102 of FIGS. 1 and/or 2, the example meter 104 of FIGS. 1, 2 and/or 5, and/or the example SDK provider 122 of FIG. 1 may alternatively be used. For example, the order of execution of the blocks may be changed, and/or some of the blocks described may be changed, eliminated, or combined.

As mentioned above, the example processes of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 6 begins when the wearable media device 102 of FIG. 1 is activated (e.g., placed on a user's head and turned on) (block 600). Inputs and outputs of the wearable media device 102, such as the sensors 200, the communication interfaces 202 and the manual opacity input 218 of FIG. 2, are initiated via, for example, a basic input/output system (BIOS) (block 602). When a media presentation is initiated or triggered on the wearable media device 102 (block 604), the example display generator 212 of FIG. 2 references the display settings 216 to determine a current opacity characteristic for displaying media on the display surface 210 (block 608). As described above, the display settings 216 receive data from, for example, the manual opacity input 218 and/or the eye tracker 208. In the illustrated example, the manual opacity input 218 is prioritized (e.g., has override authority) over instructions provided by the eye tracker 208. With the opacity information from the display settings 216, the example display generator 212 displays media at the corresponding degree of opacity on the display surface 210 (block 608). If the media presentation ends (block 610), control returns to block 604. Otherwise, the display generator 212 continues to reference the display settings 216 for the opacity information and to display the media on the display surface accordingly (blocks 606 and 608).

FIG. 7 begins when the example meter 104 of FIGS. 1, 2 and/or 5 is triggered to generate an engagement score (block 700). In some examples, the meter 104 is scheduled to generate an engagement score (e.g., every 2 seconds, every 10 seconds, every minute, etc.). Additionally or alternatively, the example meter 104 is triggered in response to, for example, a media presentation being initiated on the wearable media device 102. In the example of FIG. 7, the user identifier 514 determines an identity of the user by, for example, requesting identifying information from the user and/or referencing one more sources of user identifying information on the wearable media device 102 (block 702). Additional or alternative techniques for obtaining user identifying information may be employed such as, for example, deriving the identity based on a social security number associated with the wearable media device 102, based on a phone number associated with the wearable media device 102, based on a hardware address of the wearable media device 102 (e.g. a media access control (MAC) address of the wearable media device 102), etc. The example media detector 512 obtain media identifying information representative of the media being displayed on the wearable media device 104 (block 704).

The example opacity obtainer 502 of the example engagement level detector 500 of FIG. 5 obtains the current opacity characteristic (e.g., degree or percentage) of the currently displayed media (block 706). The opacity obtainer 502 obtains the opacity characteristic from, for example, the display settings 216, the manual opacity input 218, and/or the eye tracker 208 of the wearable media device. The score calculator 504 receives the opacity characteristic data from the opacity obtainer 502 and uses the opacity characteristic data to generate an engagement score for the currently displayed media (block 708). For example, the score calculator 504 uses the example conversions 506 to translate the determine degree of opacity into an engagement score (e.g., a likelihood that the user is paying attention to the media displayed on the wearable media device 102).

The example meter 104 (e.g., via the output device 516) generates a package of information including at least the user identifying information, the media identifying information, and the engagement score (block 710). The meter 104 employs the communication interfaces 202 of the wearable media device 102 to convey the package to the media measurement entity (block 712). As such, the media measurement entity is made aware of the identity of the user, the identity of the media being displayed on the wearable media device 102, and a score representative of an engagement (or non-engagement) of the identified user with the identified media. The example of FIG. 7 then ends (block 714).

FIG. 8 is a flowchart representative of example machine-readable instructions that may be executed to implement the media measurement entity 120 of FIG. 1. The example of FIG. 8 begins when the SDK provider 122 of the media measurement entity 120 provides an SDK to an application developer such as, for example, the media provider 106 and/or a developer associated with an app store (e.g., Apple iTunes, Google Play, etc.) (block 800). The SDK provided by the example SDK provider 122 enables the receiving application developer to create, for example, the meter 104 and/or integrate the meter 104 into one or more applications. In the illustrated example, the meter 104 of FIGS. 1, 2 and/or 5 is provided via the provided SDK. However, the meter 104 of FIGS. 1, 2 and/or 5 may be provided via, for example, an API, a programming library, a dynamically linked library (DLL), a plug-in, an add-on, etc. In some examples, the meter 104 is provided directly to the wearable media device 102 via, for example, a website, a mailed compact disc, etc. In some examples, the meter 104 is provided to a wearable media device manufacturer and/or reseller. In examples where the meter 104 is provided to the wearable media device manufacturer, the wearable media device manufacturer may design (e.g., develop, produce, manufacture, etc.) the wearable media device 102 with the meter 104 as an integrated component. In examples where the meter 104 is provided to the reseller, the reseller may install (e.g., modify, alter, adapt, etc.) the wearable media device 102 to include the meter 104 at or prior to the time of sale of the wearable media device 102 to the retailer and/or to the end user (e.g., the consumer).

The example media measurement entity 120 receives demographic information to from the user of the wearable media device 102 in connection with, for example, installation of the meter 104 on the wearable media device and/or registration with a panel associated with the media measurement entity 120 (block 802). In the illustrated example, the media measurement entity 120 assigns an identifier to the user (block 804). In some examples, the identifier is generated based on the demographic information. The identifier is then stored in a memory (e.g., a pasteboard) on the wearable media device 102 and/or the data store 128 of the media measurement entity 120. In the illustrated example, the media measurement entity 120 begins collecting monitoring data such as, for example, media identifying information (e.g., media-identifying metadata, codes, signatures, watermarks, and/or other information that may be used to identify presented media), a user identifying information, a time and/or duration of use, an engagement score, and/or demographic information (block 806). The example of FIG. 8 then ends (block 808).

Figure 9:
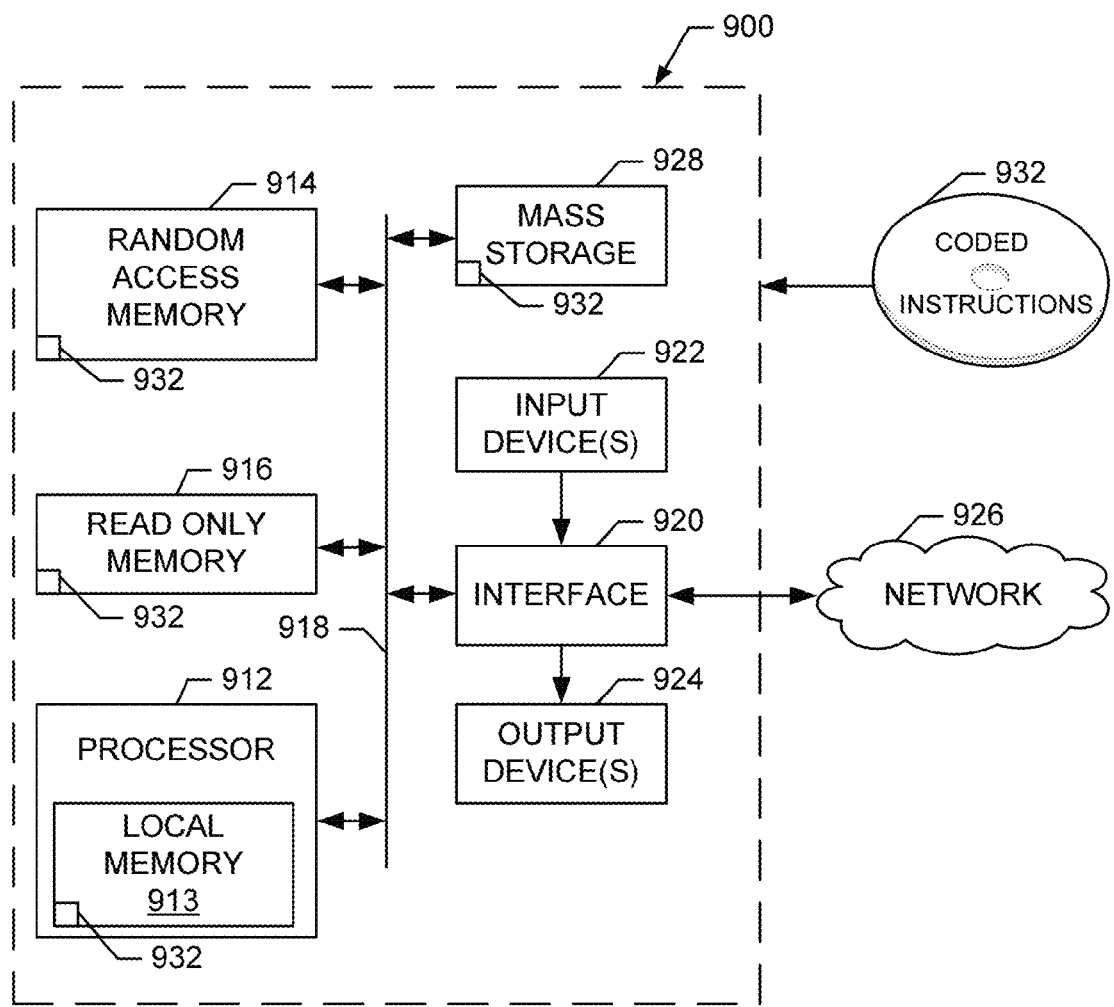
FIG. 9 is a block diagram of an example processor platform capable of executing the example machine-readable instructions of FIG. 6 to implement the example wearable media device of FIGS. 1 and/or 2, capable of executing the example machine-readable instructions of FIG. 7 to implement the example meter of FIGS. 1, 2 and/or 5, and/or capable of executing the example machine-readable instructions of FIG. 8 to implement the example media measurement entity of FIG. 1.

FIG. 9 is a block diagram of an example processor platform 900 capable of executing the instructions of FIG. 6 to implement the example wearable media device 102 of FIGS. 1 and/or 2, capable of executing the instructions of FIG. 7 to implement the example meter 104 of FIGS. 1, 2 and/or 5, and/or capable of executing the instructions of FIG. 8 to implement the example media measurement entity 120 of FIG. 1. The processor platform 900 can be, for example, a server, a personal computer, a mobile device (e.g., a cell phone, a smart phone, a tablet such as an iPad™), a wearable media device (e.g., Google Glass®), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 6, 7 and/or 8 may be stored in the mass storage device 928, in the volatile memory 914, in the non-volatile memory 916, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining, by executing an instruction with a processor, a first opacity setting, the first opacity setting being indicative of a first degree of opacity of a media presentation displayed on a wearable media device, the wearable media device including the processor, the first opacity setting obtained by a meter operating on the wearable media device via at least one of an interface with an eye tracker or an interface with a manual opacity input, the first opacity setting based on the eye tracker, the eye tracker determining an eye position of the user of the wearable media device relative to the media presentation;
   detecting, by executing an instruction with the processor, a change in the manual opacity input during the media presentation, the manual opacity input indicating a second opacity setting, different than the first opacity setting;
   in response to the detection of the change in the manual opacity input during the media presentation:
      overriding, by executing an instruction with the processor, the first opacity setting with the second opacity setting, the second opacity setting based on the manual opacity input;
      adjusting, by executing an instruction with the processor, the opacity of the media being presented based on the second opacity setting;
      calculating, by executing an instruction with the processor, an engagement score for the media presentation based on the second opacity setting, the engagement score representative of a likelihood that the user of the wearable media device is paying attention to the media presentation;
      associating, by executing an instruction with the processor, the engagement score with the media.

2. The method as defined in claim 1, wherein the determining of the degree of opacity includes determining a setting associated with a display device of the wearable media device.

3. The method as defined in claim 1, further including collecting media identifying information associated with the media.

4. The method as defined in claim 3, further including generating a record including the media identifying information and the engagement score.

5. The method as defined in claim 4, further including transmitting the record to a media measurement entity.

6. The method as defined in claim 1, further including maintaining conversion information to be used to calculate the engagement score.

7. An apparatus comprising:
   eye glasses to be worn by a user, the eye glasses including a display to present media in front of an eye of the user;
   a manual opacity input to receive user input to adjust an opacity setting, the opacity setting being indicative of a degree of transparency of the media presentation;
   a display generator to generate the media presentation on the display in accordance with a first opacity setting, the display generator to detect changes in the manual opacity input;
   an eye tracker, the first opacity setting set by the eye tracker when the user has not adjusted the opacity input during a media presentation, the eye tracker to determine an eye position of the user of the wearable media device relative to the media presentation;

in response to a detection of a change in the manual opacity input during the media presentation;
override the first opacity setting with a second opacity setting, the second opacity setting based on the change in the manual opacity input detected during the media presentation;
generate a media presentation on the display with the display generator in accordance with the second opacity setting;
a meter to:
obtain the opacity setting via at least one of an interface with the eye tracker or an interface with the manual opacity input;
generate an engagement score based on the second opacity setting; and
associating the engagement score with media identifying information representative of media associated with the media presentation.

8. The apparatus as defined in claim 7, further including a sensor to collect motion data associated with the apparatus, the meter to generate the engagement score based on a combination of the second opacity setting and the motion data.

9. The apparatus of claim 7, further including:
a sensor to collect motion data associated with the apparatus;
the meter to generate an engagement score based on a combination of the opacity setting and the motion data.

10. A tangible computer readable storage medium comprising instructions that, when executed, cause a machine to at least:
access a first opacity value during a media presentation on a wearable media device, the first opacity value obtained by a meter operating on the wearable media device via at least one of an interface with an eye tracker or an interface with a manual opacity input, the first opacity value based on the eye tracker when a user of the wearable media device has not adjusted the manual opacity input during the media presentation, the eye tracker determining an eye position of the user of the wearable media device relative to the media presentation;
detect a change in the manual opacity input during the media presentation, the manual opacity input indicating a second opacity value, different than the first opacity value;
in response to the detection of the change in the manual opacity input:
override the first opacity value with the second opacity value, the second opacity value based on the change in the manual opacity input;
adjust the opacity of the media being presented based on the second opacity value;
calculate an engagement score for the media based on the second opacity value, the engagement score representative of a likelihood that the user of the wearable media device is paying attention to the media presentation.

11. The storage medium as defined in claim 10, wherein the instructions, when executed, cause the machine to access the opacity value by referencing a setting associated with a display device of the wearable media device.

12. The storage medium as defined in claim 10, wherein the instructions, when executed, cause the machine to collect media identifying information associated with the media.

13. A method, comprising:
determining, by executing an instruction with a processor, a first opacity setting, the first opacity setting being indicative of a first degree of opacity of a media presentation displayed on a wearable media device, the wearable media device including the processor, the first opacity setting obtained by a meter operating on the wearable media device via at least one of an interface with an eye tracker or an interface with a manual opacity input, the first opacity setting based on the eye tracker, the eye tracker determining an eye position of a user of the wearable media device relative to the media presentation;
detecting, by executing an instruction with the processor, a change in the manual opacity input during the media presentation, the manual opacity input indicating a second opacity setting, different than the first opacity setting;
in response to the detection of the change in the manual opacity input during the media presentation:
overriding the first opacity setting with the second opacity setting, the second opacity setting based on the manual opacity input;
calculating, with the processor, an engagement score for media presented via the media presentation based on the second degree of opacity; and
maintaining conversion information to be used to calculate the engagement score.

* * * * *